US012774107B2

(12) United States Patent
Richardson et al.

(10) Patent No.: US 12,774,107 B2
(45) Date of Patent: Oct. 27, 2026

(54) UNDERWING HEAT EXCHANGER ASSEMBLY FOR AN AIRCRAFT

(71) Applicant: Pratt & Whitney Canada Corp., Longueuil (CA)

(72) Inventors: Tyler Richardson, Toronto (CA); John Galas, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 326 days.

(21) Appl. No.: 18/667,594

(22) Filed: May 17, 2024

(65) Prior Publication Data

US 2025/0353606 A1 Nov. 20, 2025

(51) Int. Cl.

*B64D 33/08* (2006.01)
*B64C 7/00* (2006.01)
*F28F 9/007* (2006.01)

(52) U.S. Cl.

CPC ................ *B64D 33/08* (2013.01); *B64C 7/00* (2013.01); *F28F 9/007* (2013.01)

(58) Field of Classification Search

CPC ............. F28F 9/007; B64D 33/08; B64C 7/00
See application file for complete search history.

(56) References Cited

U.S. PATENT DOCUMENTS

| | | | | |
|---|---|---|---|---|
| 1,412,073 A | | 4/1922 | Ludwig | |
| 1,682,204 A | | 8/1928 | William | |
| 3,000,193 A | * | 9/1961 | Crider | F24F 5/001 62/449 |
| 8,851,425 B2 | | 10/2014 | Ferrendier | |
| 2005/0268612 A1 | * | 12/2005 | Rolt | F02C 7/185 60/728 |
| 2018/0050824 A1 | | 2/2018 | Regnault | |

(Continued)

FOREIGN PATENT DOCUMENTS

| | | |
|---|---|---|
| CN | 214930566 U | 11/2021 |
| GB | 523245 A | 7/1940 |

(Continued)

OTHER PUBLICATIONS

EP search report for EP25177125.9 dated Aug. 25, 2025.

*Primary Examiner* — Devon Lane
(74) *Attorney, Agent, or Firm* — Getz Balich LLC

(57) ABSTRACT

An assembly for an aircraft includes a wing assembly, a plurality of underwing heat exchangers, and a mounting assembly. The wing assembly includes a wing body. The plurality of underwing heat exchangers are arranged along the wing body in a longitudinal direction. The plurality of underwing heat exchangers includes a first underwing heat exchanger and a second underwing heat exchanger. The first underwing heat exchanger is longitudinally adjacent the second underwing heat exchanger. The mounting assembly includes a first heat exchanger bracket, a second heat exchanger bracket, and a first support bracket. The first heat exchanger bracket is fixedly mounted to the first underwing heat exchanger. The second heat exchanger bracket is fixedly mounted to the second underwing heat exchanger. The first heat exchanger bracket and the second heat exchanger bracket are pivotably mounted to the first support bracket. The first support bracket is fixedly mounted to the wing body.

20 Claims, 7 Drawing Sheets

(56) References Cited

U.S. PATENT DOCUMENTS

| | | | |
|---|---|---|---|
| 2023/0027644 | A1 | 1/2023 | Orr |
| 2023/0105126 | A1 | 4/2023 | Benson |
| 2023/0242267 | A1 | 8/2023 | Sobanski |

FOREIGN PATENT DOCUMENTS

| | | | | | |
|---|---|---|---|---|---|
| GB | 2571767 | A | * | 9/2019 | ........... F28D 1/0443 |
| WO | WO-2008155386 | A1 | * | 12/2008 | ........... B64D 27/406 |

* cited by examiner

UNDERWING HEAT EXCHANGER ASSEMBLY FOR AN AIRCRAFT

TECHNICAL FIELD

This disclosure relates to an underwing heat exchanger assembly for an aircraft propulsion system.

BACKGROUND OF THE ART

Some propulsion systems for aircraft may include heat exchanger cooling assemblies configured to cool or heat one or more fluids (e.g., lubricant, fuel, cooling air, etc.) for the propulsion system. Various heat exchanger cooling systems are known in the art for controlling fluid temperatures. While these known systems may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft includes a wing assembly, a plurality of underwing heat exchangers, and a mounting assembly. The wing assembly includes a wing body. The plurality of underwing heat exchangers are arranged along the wing body in a longitudinal direction of the wing assembly. The plurality of underwing heat exchangers includes a first underwing heat exchanger and a second underwing heat exchanger. The first underwing heat exchanger is longitudinally adjacent the second underwing heat exchanger. The mounting assembly mounts the plurality of underwing heat exchangers to the wing body, the mounting assembly includes a plurality of heat exchanger brackets and a plurality of support brackets. The plurality of heat exchanger brackets includes a first heat exchanger bracket and a second heat exchanger bracket. The plurality of support brackets includes a first support bracket. The first heat exchanger bracket is fixedly mounted to the first underwing heat exchanger. The second heat exchanger bracket is fixedly mounted to the second underwing heat exchanger. The first heat exchanger bracket and the second heat exchanger bracket are pivotably mounted to the first support bracket on a pivot axis. The first support bracket is fixedly mounted to the wing body.

In any of the aspects or embodiments described above and herein, the wing body may include an upper skin and a lower skin. The mounting assembly may mount the plurality of underwing heat exchangers on the lower skin.

In any of the aspects or embodiments described above and herein, the wing assembly may further include an underwing fairing mounted to the wing body. The wing body and the underwing fairing may form an air passage through the wing assembly. The plurality of underwing heat exchangers may be disposed within the air passage.

In any of the aspects or embodiments described above and herein, the pivot axis may extend in a lateral direction orthogonal to the longitudinal direction.

In any of the aspects or embodiments described above and herein, the first heat exchanger bracket and the second heat exchanger bracket may be axially coincident relative to the pivot axis.

In any of the aspects or embodiments described above and herein, each of the heat exchanger brackets may include a bracket body. The bracket body may extend between and to a first longitudinal end and a second longitudinal end. The bracket body may extend between and to a first lateral end and a second lateral end. The bracket body may include a panel body portion and a lapped body end portion. The panel body portion may extend along the first lateral end from the second longitudinal end to the lapped body end portion. The lapped body end portion may be disposed at the first longitudinal end. The lapped body end portion may be laterally spaced from the first lateral end.

In any of the aspects or embodiments described above and herein, the panel body portion of the first heat exchanger bracket may be pivotably mounted to the first support bracket on the pivot axis and the lapped body end portion of the second heat exchanger bracket may be pivotably mounted to the first support bracket on the pivot axis.

In any of the aspects or embodiments described above and herein, the assembly may further include an aircraft propulsion system. The aircraft propulsion system may include a coolant load and a thermal management assembly connected in fluid communication with the coolant load. The thermal management assembly may include at least one of the plurality of underwing heat exchangers.

According to another aspect of the present disclosure, an assembly for an aircraft includes a wing assembly, a plurality of underwing heat exchangers, and a mounting assembly. The wing assembly includes a wing body. The plurality of underwing heat exchangers are arranged along the wing body in a longitudinal direction of the wing assembly. The mounting assembly mounts the plurality of underwing heat exchangers to the wing body. The mounting assembly includes a plurality of heat exchanger brackets and a plurality of support brackets. Each of the heat exchanger brackets is fixedly mounted to a respective one of the plurality of underwing heat exchangers. Each of the heat exchanger brackets includes a bracket body extending between and to a first longitudinal end and a second longitudinal end. The bracket body is pivotably mounted to a first support bracket of the plurality of support brackets at the first longitudinal end. The bracket body is pivotably mounted to a second support bracket of the plurality of support brackets at the second longitudinal end. Each of the plurality of support brackets is fixedly mounted to the wing body.

In any of the aspects or embodiments described above and herein, the wing body may include an upper skin and a lower skin. The mounting assembly may mount the plurality of underwing heat exchangers on the lower skin.

In any of the aspects or embodiments described above and herein, the wing assembly may further include an underwing fairing mounting to the wing body. The wing body and the underwing fairing may form an air passage through the wing assembly. The plurality of underwing heat exchangers may be disposed within the air passage.

In any of the aspects or embodiments described above and herein, the bracket body may be pivotably mounted to the first support bracket on a first pivot axis. The bracket body may be pivotably mounted to the second support bracket on a second pivot axis. The first pivot axis and the second pivot axis may extend in a lateral direction orthogonal to the longitudinal direction.

In any of the aspects or embodiments described above and herein, the plurality of underwing heat exchangers may include a first underwing heat exchanger and a second underwing heat exchanger. The plurality of heat exchanger brackets may include a first heat exchanger bracket and a second heat exchanger bracket. The first heat exchanger bracket may be fixedly mounted to the first underwing heat exchanger. The second heat exchanger bracket may be fixedly mounted to the second underwing heat exchanger. The first heat exchanger bracket and the second heat exchanger bracket may be pivotably mounted to a same support bracket of the plurality of support brackets.

In any of the aspects or embodiments described above and herein, the bracket body may extend between and to a first lateral end and a second lateral end. The bracket body may include a panel body portion and a lapped body end portion. The panel body portion may extend along the first lateral end from the second longitudinal end to the lapped body end portion. The lapped body end portion may be disposed at the first longitudinal end. The lapped body end portion may be laterally spaced from the first lateral end.

In any of the aspects or embodiments described above and herein, the panel body portion may be pivotably mounted to the first support bracket and the lapped body end portion may be pivotably mounted to the second support bracket.

According to another aspect of the present disclosure, an assembly for an aircraft includes a wing assembly, a plurality of underwing heat exchangers, and a mounting assembly. The wing assembly includes a wing body. The wing body includes an upper skin and a lower skin. The lower skin forms a lower aerodynamic surface of the wing body. The plurality of underwing heat exchangers is arranged along the lower aerodynamic surface in a longitudinal direction of the wing assembly. The plurality of underwing heat exchangers includes a first underwing heat exchanger and a second underwing heat exchanger. The first underwing heat exchanger is longitudinally adjacent the second underwing heat exchanger. The mounting assembly includes a first heat exchanger bracket, a second heat exchanger bracket, and a first support bracket. The first heat exchanger bracket is fixedly mounted to the first underwing heat exchanger. The second heat exchanger bracket is fixedly mounted to the second underwing heat exchanger. The first heat exchanger bracket and the second heat exchanger bracket are pivotably mounted to the first support bracket on a pivot axis. The first support bracket is fixedly mounted on the wing body at the lower aerodynamic surface.

In any of the aspects or embodiments described above and herein, the wing assembly may further include an underwing fairing. The wing body and the underwing fairing may form an air passage between the lower aerodynamic surface and the underwing fairing. The plurality of underwing heat exchangers may be disposed within the air passage.

In any of the aspects or embodiments described above and herein, the pivot axis may extend in a lateral direction orthogonal to the longitudinal direction.

In any of the aspects or embodiments described above and herein, the first heat exchanger bracket and the second heat exchanger bracket may be axially coincident relative to the pivot axis.

In any of the aspects or embodiments described above and herein, the first heat exchanger bracket and the second heat exchanger bracket may each include a bracket body. The bracket body may extend between and to a first longitudinal end and a second longitudinal end. The bracket body may extend between and to a first lateral end and a second lateral end. The bracket body may include a panel body portion and a lapped body end portion. The panel body portion may extend along the first lateral end from the second longitudinal end to the lapped body end portion. The lapped body end portion may be disposed at the first longitudinal end. The lapped body end portion may be laterally spaced from the first lateral end.

The present disclosure, and all its aspects, embodiments and advantages associated therewith will become more readily apparent in view of the detailed description provided below, including the accompanying drawings.

DETAILED DESCRIPTION

Figure 1:
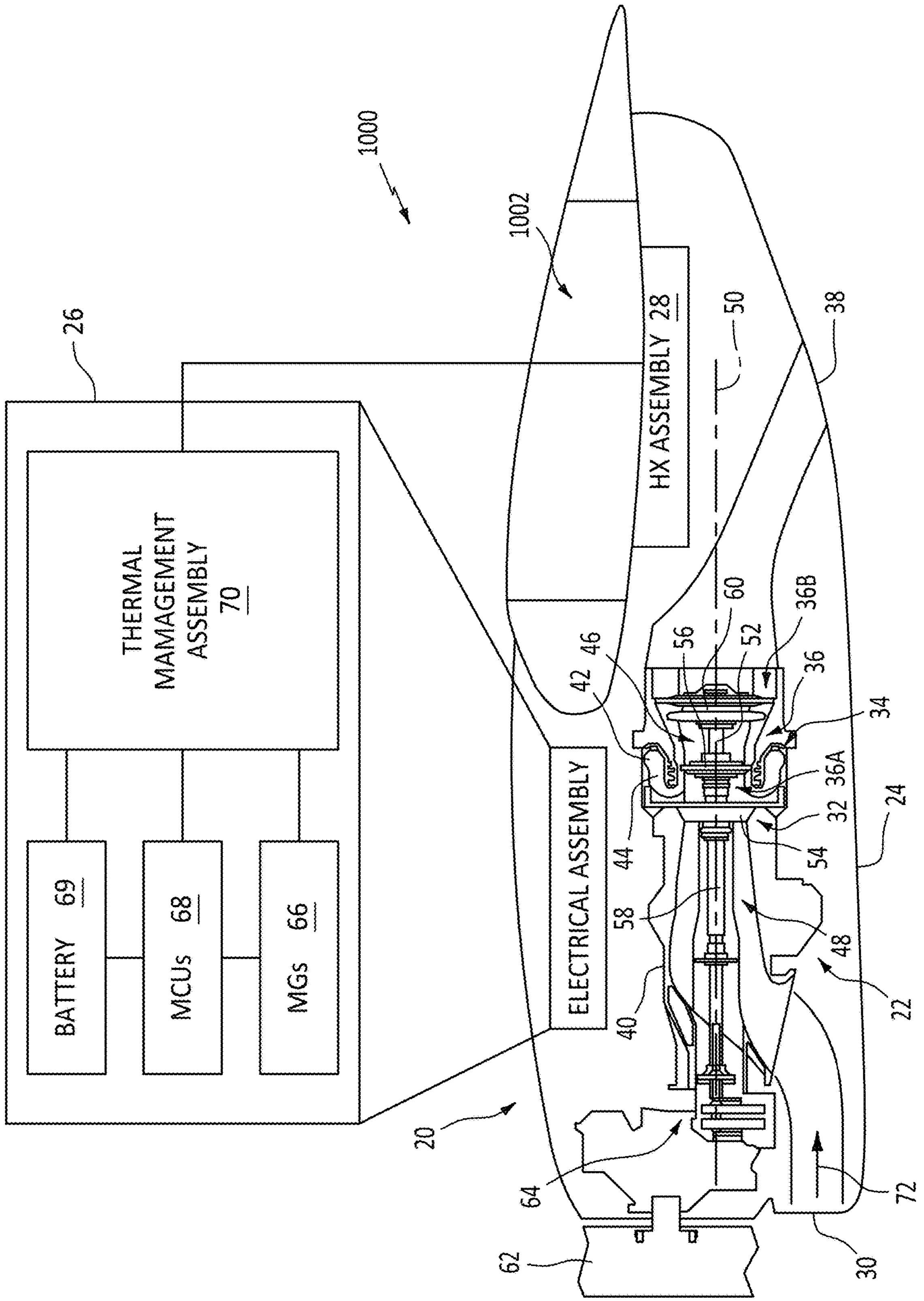
FIG. 1 schematically illustrates a cutaway, side view of an aircraft propulsion system, in accordance with one or more embodiments of the present disclosure.

FIG. 1 schematically illustrates an aircraft 1000 including a propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). For example, the propulsion system 20 of FIG. 1 is disposed on the aircraft 1000 at (e.g., on, adjacent, or proximate) a wing assembly 1002 (e.g., port and starboard wing assemblies) of the aircraft 1000. The present disclosure, however, is not limited to the particular propulsion system 20 and aircraft 1000 mounting configuration of FIG. 1. The propulsion system 20 of FIG. 1 is configured as a hybrid-electric gas turbine engine propulsion system. The propulsion system 20 of FIG. 1 includes a gas turbine engine 22, a nacelle 24, an electrical system 26, and an underwing heat exchanger assembly 28.

The gas turbine engine 22 of FIG. 1 is configured as a turboprop engine. However, the present disclosure is not limited to any particular configuration of gas turbine engine for the propulsion assembly 20, and examples of gas turbine engine configurations for the propulsion system 20 may include, but are not limited to, a turbofan engine, a turbojet engine, a propfan engine, or the like. Moreover, aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.).

The gas turbine engine 22 of FIG. 1 includes an air intake 30, a compressor section 32, a combustor section 34, a turbine section 36, an exhaust section 38, and an engine static structure 40. The combustor section 34 includes a combustor 42 (e.g., an annular combustor). The combustor 42 forms an internal combustion chamber 44 (e.g., an annular combustion chamber). The turbine section 36 of FIG. 1 includes a high-pressure turbine section 36A and a power turbine section 36B.

The compressor section 32 and the turbine section 36 of FIG. 1 form a first rotational assembly 46 (e.g., a high-pressure spool) and a second rotational assembly 48 of the gas turbine engine 22. The first rotational assembly 46 and the second rotational assembly 48 are mounted for rotation about a rotational axis 50 of the gas turbine engine 22 relative to the engine static structure 40.

The first rotational assembly 46 includes a first shaft 52, a bladed compressor rotor 54 for the compressor section 32, and a bladed first turbine rotor 56 for the high-pressure turbine section 36A. The first shaft 52 interconnects the bladed compressor rotor 54 and the bladed first turbine rotor 56.

The second rotational assembly 48 includes a second shaft 58 and a bladed second turbine rotor 60 (e.g., a power turbine rotor). The second shaft 58 is connected to the bladed second turbine rotor 60. The second shaft 58 is coupled to a bladed propulsor rotor 62 (e.g., an air mover) of the propulsion system 20. For example, the second shaft 58 of FIG. 1 is coupled to the propulsor rotor 62 by a geartrain 64 (e.g., a transmission, a speed change device, an epicyclic geartrain, etc.). The propulsor rotor 62 includes a plurality of rotor blades arranged circumferentially around and connected to at least (or only) one rotor disk or hub. The propulsor rotor 62 may be an open (e.g., un-ducted) propulsor rotor or a ducted propulsor rotor. Examples of the open propulsor rotor include, but are not limited to, a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. Examples of the ducted propulsor rotor include, but are not limited to, a fan rotor for a turbofan propulsion system and a (e.g., first stage) compressor rotor for a turbojet propulsion system.

The engine static structure 40 includes engine casings, cowlings, and other fixed (e.g., non-rotating) structures of the gas turbine engine 22 which house and/or structurally support components of the gas turbine engine 22 such as, but not limited to, the air intake 30, the compressor section 32, the combustor section 34, the turbine section 36, and the exhaust section 37. The engine static structure 40 includes one or more bearing assemblies, gear boxes, or the like configured to rotationally support components of the first rotational assembly 46 and/or the second rotational assembly 48.

The nacelle 24 houses the gas turbine engine 22 and forms and aerodynamic cover for the propulsion system 20. The nacelle 24 may extend about (e.g., completely around) and surround the gas turbine engine 22 along the rotational axis 50. The nacelle 24 may additionally surround and/or form portions of the air intake 30 and the exhaust section 38. The nacelle 24 may be mounted to or otherwise disposed at (e.g., on, adjacent, or proximate) one or more of the wing assembly 1002 of the aircraft 1000.

As will be discussed in further detail below, the electrical assembly 26 of FIG. 1 includes one or more motor-generators 66, one or more motor control units 68, a battery 69, and a thermal management assembly 70. The motor-generators 66 may be operably connected to the first rotational assembly 46 (e.g., the first shaft 52) and/or the second rotational assembly 48 (e.g., the second shaft 58) to drive rotation of the rotational assemblies 46, 48 or to be rotationally driven by the rotational assemblies 46, 48 to generate electrical power. Each of the motor control units 68 may be electrically connected to a respective one of the motor-generators 66 to control the operation of the respective one of the motor-generators 66. Each of the motor control units 68 may additionally be electrically connected to the battery 69. The motor control units 68 may be connected in signal communication with and controlled by an electronic engine control (EEC) unit, a full authority digital engine control (FADEC) unit, or another control unit of the propulsion system 20 or its gas turbine engine 22. The thermal management assembly 70 is connected in fluid communication with the motor-generators 66 and the motor control units 68 to facilitate cooling of the motor-generators 66 and the motor control units 68.

In operation of the gas turbine engine 22 of FIG. 1, ambient air is directed through the air intake 30 and into a core flow path 72 (e.g., an annular flow path). Air flow along the core flow path 72 is compressed by the bladed compressor rotor 54 in the compressor section 32, mixed and burned with fuel in the combustor 42, and then directed through the high-pressure turbine section 36A and the power turbine section 36B. The bladed first turbine rotor 56 and the bladed second turbine rotor 60 rotationally drive the first rotational assembly 46 and the second rotational assembly 48, respectively, in response to the combustion gas flow through the high-pressure turbine section 36A and the power turbine section 36B.

Figure 2B:
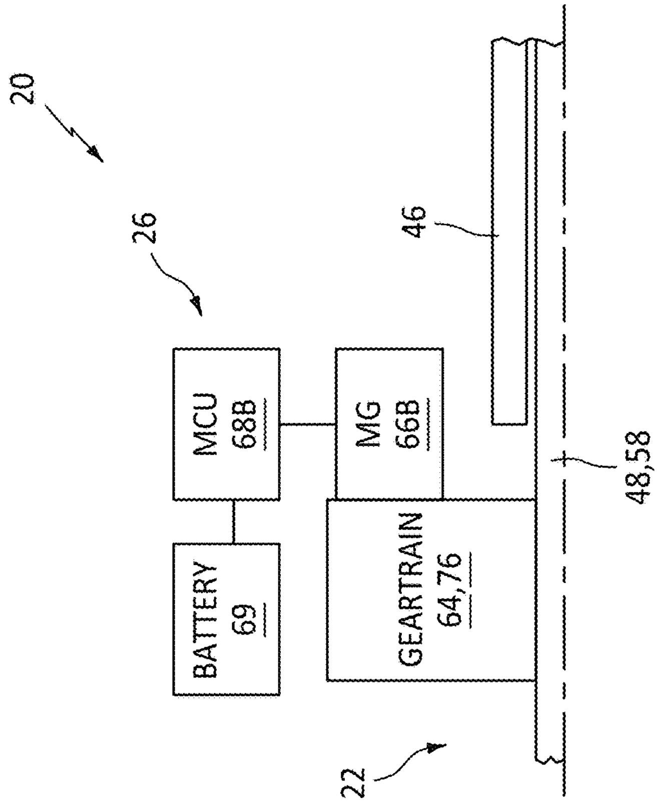
FIGS. 2A-B schematically components of an electrical assembly for an aircraft propulsion system, in accordance with one or more embodiments of the present disclosure.
Figure 2A:
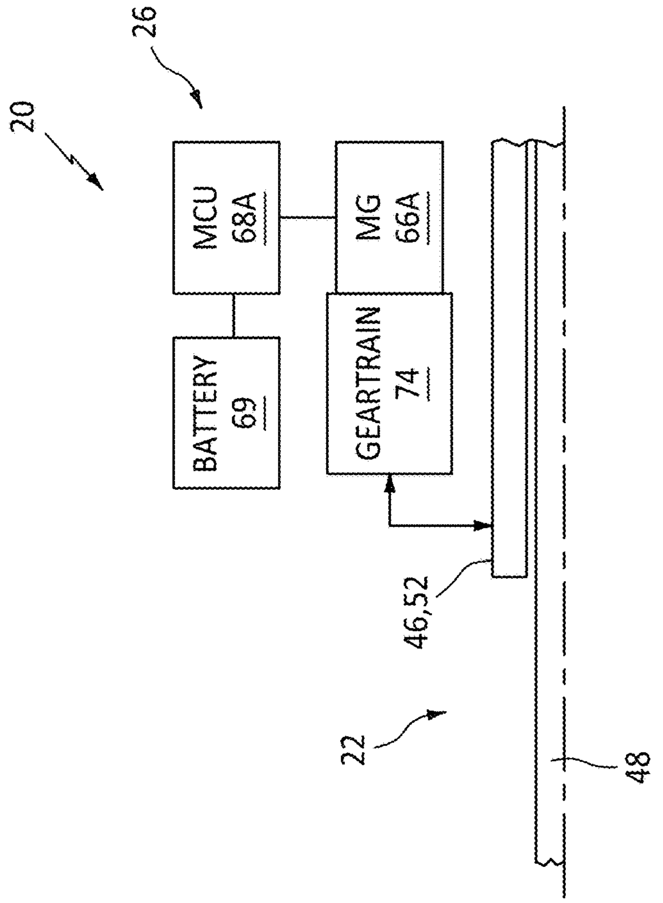

FIGS. 2A and 2B schematically illustrate components of the propulsion system 20 and its electrical assembly 26 in greater detail. The motor-generators 66 may include a motor-generator 66A for the first rotational assembly 46 and/or a motor-generator 66B for the second rotational assembly 48. The motor control units 68 may include a motor-control unit 68A for the motor-generator 66A and/or a motor-control unit 68B for the motor-generator 66B. Referring to FIG. 2A, the motor-generator 66A is operably connected to the first rotational assembly 46 (e.g., the first shaft 52). For example, the motor-generator 66A of FIG. 2A is coupled to the first rotational assembly 46 by a gear train 74. The gear train 74 may be configured as a transmission, a speed change device, an epicyclic geartrain, a bevel gear assembly, or any other suitable gear assembly for coupling the motor-generator 66A and the first rotational assembly 46. Alternatively, the motor-generator 66A may be directly coupled to the first rotational assembly 46 (e.g., the first shaft 52). Referring to FIG. 2B, the motor-generator 66B is operably connected to the second rotational assembly 48 (e.g., the second shaft 58). For example, the motor-generator 66B of FIG. 2B is coupled to the second rotational assembly 48 by a gear train 76. The gear train 76 may be configured as a transmission, a speed change device, an epicyclic geartrain, a bevel gear assembly, or any other suitable gear assembly for coupling the motor-generator 66B and the second rotational assembly 48. As shown in FIG. 2B, the gear train 76 may be the gear train 64 coupling the second rotational assembly 48 to the propulsor rotor 62. Alternatively, the motor-generator 66A may be directly coupled to the second rotational assembly 48 (e.g., the second shaft 58) or to the propulsor rotor 62 (see FIG. 1). It should be understood, however, that the present disclosure is not limited to the foregoing exemplary configurations of the propulsion system 20.

Figure 3:
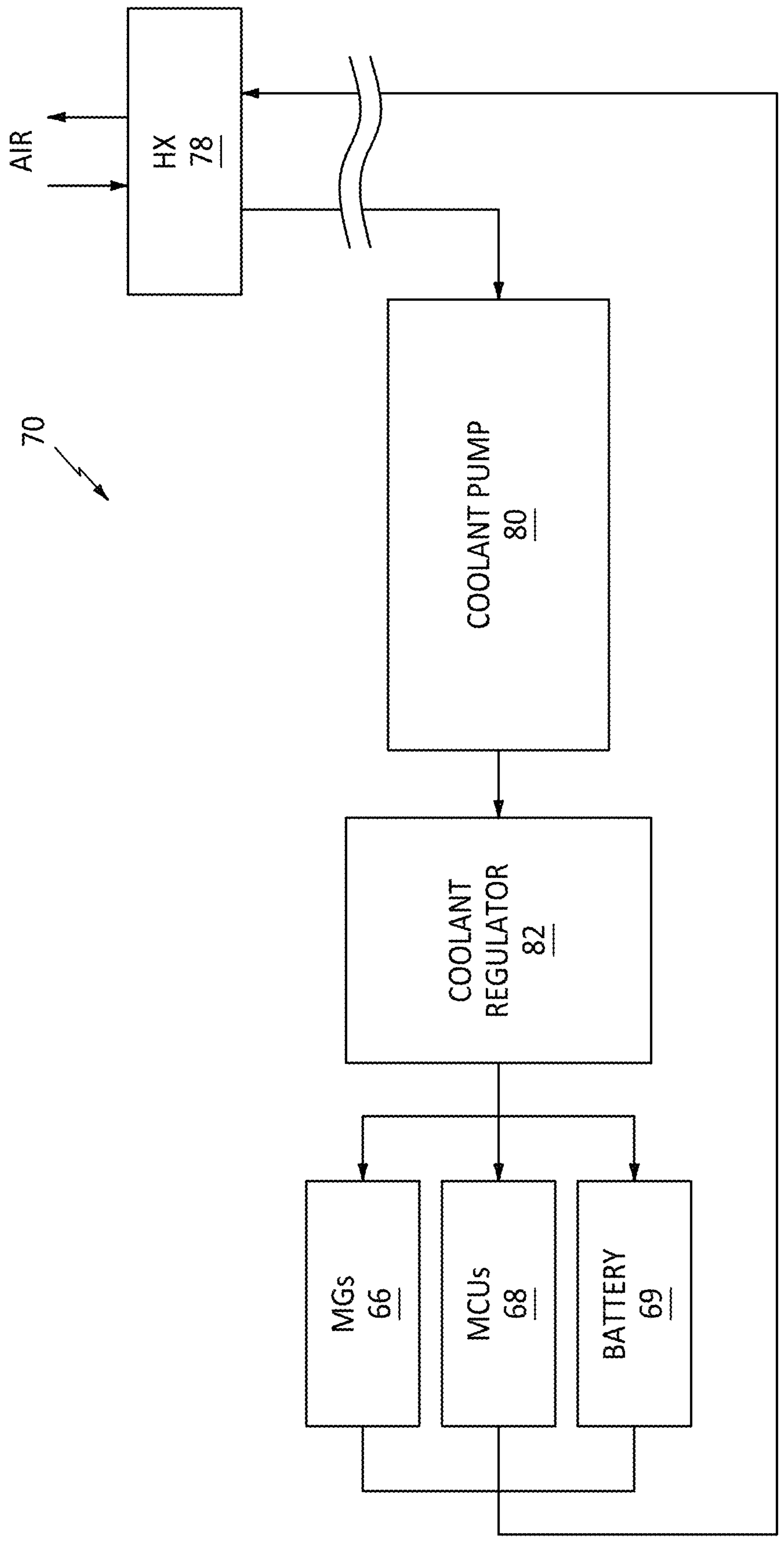
FIG. 3 schematically illustrates a thermal management assembly for an aircraft propulsion system, in accordance with one or more embodiments of the present disclosure.

FIG. 3 schematically illustrates the thermal management assembly 70. The thermal management assembly 70 of FIG. 3 includes one or more heat exchangers 78, a coolant pump 80, and a coolant regulator 82. The present disclosure, however, is not limited to the foregoing exemplary configuration of the thermal management assembly 70 and the thermal management assembly 70 may additionally or alternatively include other components for facilitating thermal management of the motor-generators 66 and the motor control units 68 such as, but not limited to, a coolant tank, control valves, coolant filters, and the like. Fluid interconnections between components of the thermal management assembly 70, the motor-generators 66, and the motor control units 68 may be made by any suitable conduit (e.g., pipe, hose, tube, etc.). The heat exchangers 78 are air-liquid heat exchangers, as will be discussed below in further detail. For example, the heat exchangers 78 are configured to facilitate heat transfer from a coolant (e.g., oil, refrigerants, ammonia-based coolants, ethylene glycol (EG), propylene glycol (PG), or propylene glycol with water (PGW), etc.) to air flowing through the heat exchangers 78. The coolant pump 80 is connected in fluid communication with the heat exchanger. The coolant pump 80 is configured to direct (e.g., pump) the coolant to one or more coolant loads of the thermal management assembly 70 such as, but not limited to, the motor-generators 66, the motor control units 68, and/or the battery 69. The coolant regulator 82 may be connected in fluid communication between the coolant pump 80 and the coolant loads to control a flow rate of the coolant to each of the coolant loads. The thermal management assembly 70 of FIG. 3 is configured to supply coolant for each of the motor-generators 66, the motor control units 68, and/or the battery 69, however, the thermal management assembly 70 may alternatively be configured with discrete cooling systems for the motor-generators 66, the motor control units 68, and/or the battery 69.

Figure 4:
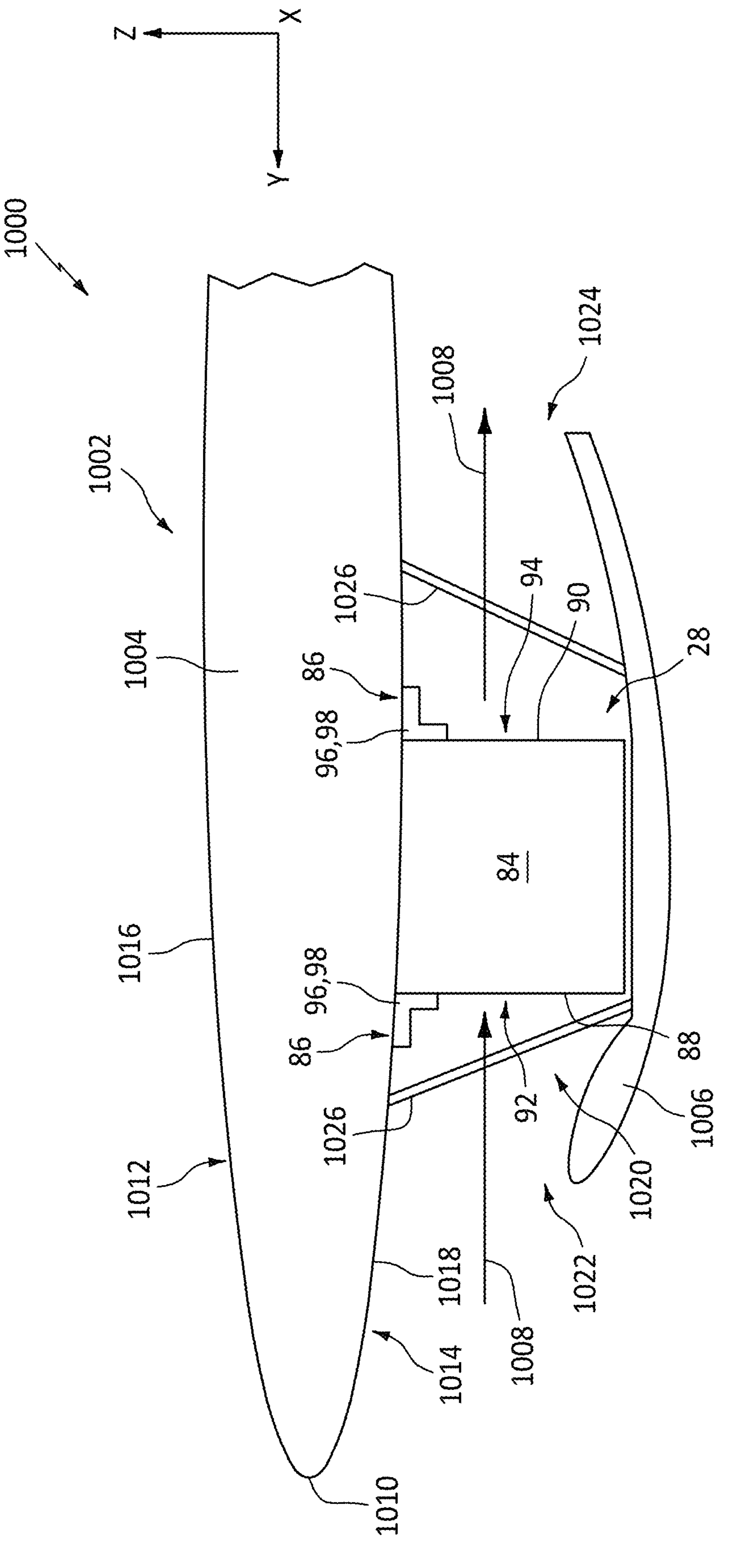
FIG. 4 schematically illustrates a cutaway, side view of an underwing heat exchanger assembly for an aircraft propulsion system, in accordance with one or more embodiments of the present disclosure.
Figure 5:
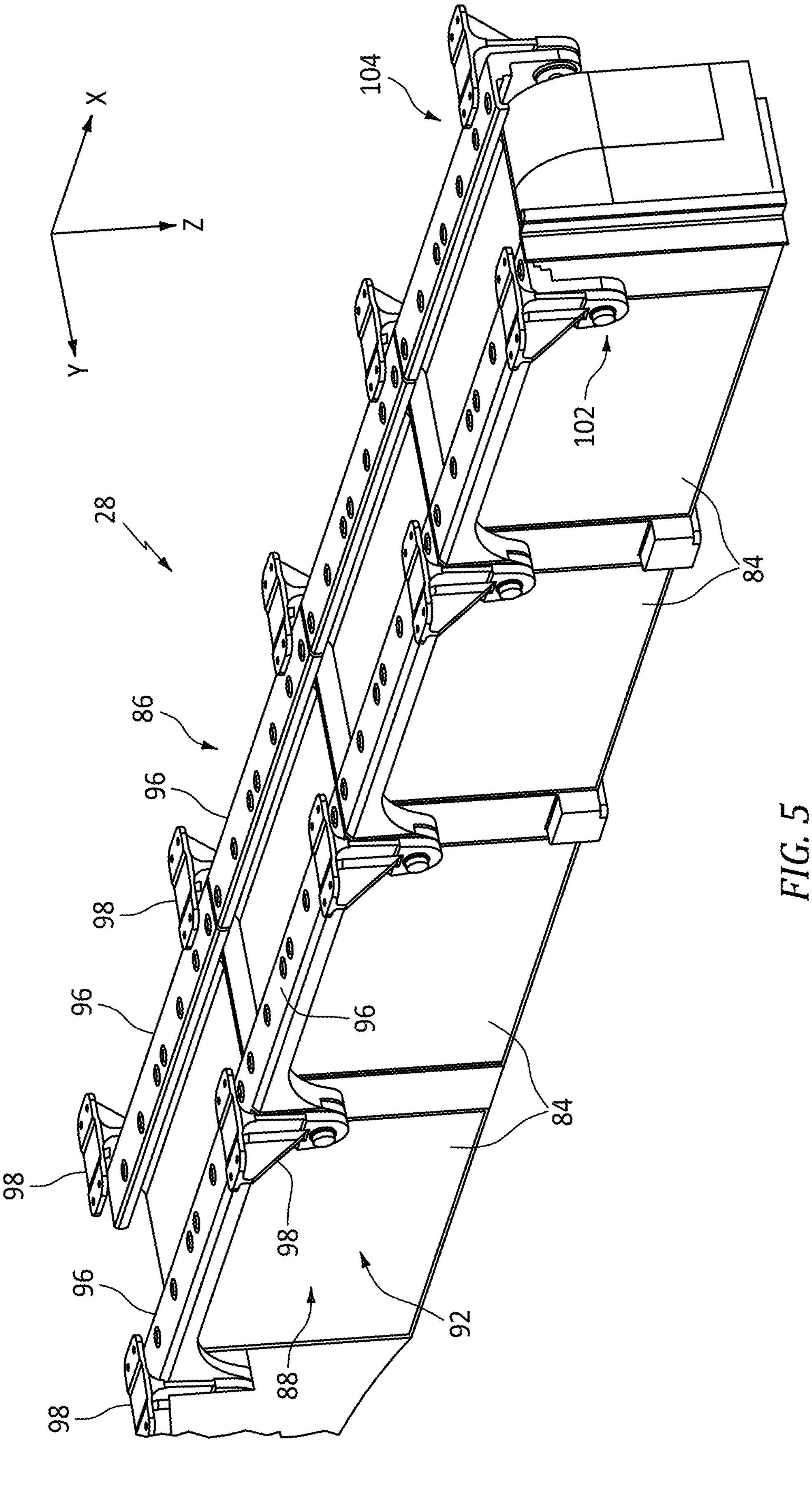
FIG. 5 illustrates a perspective view of the underwing heat exchanger assembly including a mounting assembly, in accordance with one or more embodiments of the present disclosure.

Referring to FIGS. 4 and 5, the underwing heat exchanger assembly 28 is illustrated in greater detail. FIG. 4 schematically illustrates a cutaway, side view of the underwing heat exchanger assembly 28 installed on the wing assembly 1002. FIG. 5 illustrates a perspective view of the underwing heat exchanger assembly 28 with the wing assembly 1002 omitted.

The wing assembly 1002 of FIG. 4 includes a wing body 1004. The wing assembly 1002 may additionally include a underwing fairing 1006. The wing body 1004 extends longitudinally, for example, along an X-axis as shown in FIGS. 4 and 5. The wing body 1004 may extend longitudinally outward from the nacelle 24, a fuselage of the aircraft 1000 (see FIG. 1), or another aerostructure of the aircraft 1000. The wing body 1004 extends laterally, for example, along a Y-axis as shown in FIGS. 4 and 5. Accordingly, the wing body 1004 may be understood as being cantilevered from the nacelle 24, a fuselage of the aircraft 1000, or another aerostructure of the aircraft 1000 in the longitudinal direction. The Y-axis may be understood as oriented in a generally direction of air flow 1008 across the wing body 1004 during a flight condition of the aircraft 1000. The wing body 1004 of FIG. 4 extends between and to a leading edge 1010 of the wing body 1004 and a trailing edge of the wing body 1004 (not shown) downstream of the leading edge 1010 relative to the air flow 1008. The wing body 1004 extends vertically, for example, along a Z-axis as shown in FIGS. 4 and 5, between and to an upper skin 1012 of the wing body 1004 and a lower skin 1014 of the wing body 1004. Each of the upper skin 1012 and the lower skin 1014 extend (e.g., laterally extend) from the leading edge 1010 to or toward the trailing edge. The upper skin 1012 and the lower skin 1014 form exterior, aerodynamic surfaces of the wing body 1004. For example, the upper skin 1012 forms an upper aerodynamic surface 1016 of the wing body 1004 and the lower skin 1014 forms a lower aerodynamic surface 1018 of the wing body 1004.

The underwing heat exchanger assembly 28 includes a plurality of underwing heat exchangers 84 and a mounting assembly 86. The underwing heat exchangers 84 are arranged longitudinally along the wing assembly 1002 (e.g., the wing body 1004). For example, the underwing heat exchanger assembly 28 of FIG. 5 includes four underwing heat exchangers 84 arranged sequentially along the wing body 1004 in the longitudinal direction. The present disclosure, however, is not limited to any particular number of the underwing heat exchangers 84 for the underwing heat exchanger assembly 28. The underwing heat exchangers 84 may include the heat exchangers 78 of the thermal management assembly 70 (see FIG. 3). The underwing heat exchangers 84 may additionally include other heat exchangers for other fluid cooling systems of the aircraft 1000, the propulsion system 20, and/or the gas turbine engine 22 such as, but not limited to, an air-oil heat exchanger for one or more bearing and/or lubrication assemblies of the gas turbine engine 22, a heat exchanger for an engine casing, combustor casing, or other static structure of the gas turbine engine 22, a compressor bleed air pre-cooler for an environmental control system of the aircraft 1000, or the like, and the present disclosure is not limited to any particular heat exchanger or cooling system in combination with the underwing heat exchanger assembly 28. Other fluid cooling systems of the aircraft 1000, the propulsion system 20, and/or the gas turbine engine 22, for example, may be configured similar to the thermal management assembly 70 of FIG. 3. Each of the underwing heat exchangers 84 extends (e.g., laterally extends) between and to an upstream end 88 of the underwing heat exchanger 84 and a downstream end 90 of the underwing heat exchanger 84. Each of the underwing heat exchangers 84 includes an air inlet 92 at (e.g., on, adjacent, or proximate) the upstream end 88 and an air outlet 94 at (e.g., on, adjacent, or proximate) the downstream end 90. The air flow 1008 is directed through each of the underwing heat exchangers 84 from the air inlet 92 to the air outlet 94 to facilitate cooling or thermal conditioning of one or more components, fluid systems, or the like.

The mounting assembly 86 is configured to mount the underwing heat exchangers 84 to the wing body 1004. The mounting assembly 86 includes a plurality of heat exchanger brackets 96 and a plurality of support brackets 98. Each of the heat exchanger brackets 96 is fixedly mounted to one of the underwing heat exchangers 84 (e.g., by one or more mechanical fasteners). Each of the heat exchanger brackets 96 is pivotably mounted to two of the support brackets 98, as will be discussed in further detail below. For example, each of the heat exchanger brackets 96 may be pivotably mounted to a longitudinally adjacent pair of the support brackets 98. Each of the support brackets 98 is fixedly mounted to the wing body 1004 (e.g., by one or more mechanical fasteners). For example, each of the support brackets 98 may be mounted to the wing body 1004 at (e.g., on, adjacent, or proximate) the lower skin 1014 (e.g., the lower aerodynamic surface 1018) as shown, for example, in FIG. 4.

The mounting assembly 86 of FIGS. 4 and 5 forms an upstream subassembly 102 of the heat exchanger brackets 96 and the support brackets 98 and a downstream subassembly 104 of the heat exchanger brackets 96 and the support brackets 98. The heat exchanger brackets 96 and the support brackets 98 of the upstream subassembly assembly 102 are interconnected and collectively extend along the wing body 1004 and the underwing heat exchangers 84 in the longitudinal direction. Each of the heat exchanger brackets 96 of the upstream subassembly 102 is fixedly mounted to a respective one of the underwing heat exchangers 84 at (e.g., on, adjacent, or proximate) the upstream end 88. The heat exchanger brackets 96 and the support brackets 98 of the downstream subassembly assembly 104 are interconnected and collectively extend along the wing body 1004 and the underwing heat exchangers 84 in the longitudinal direction. Each of the heat exchanger brackets 96 of the downstream subassembly 104 is fixedly mounted to a respective one of the underwing heat exchangers 84 at (e.g., on, adjacent, or proximate) the downstream end 90.

Figure 6:
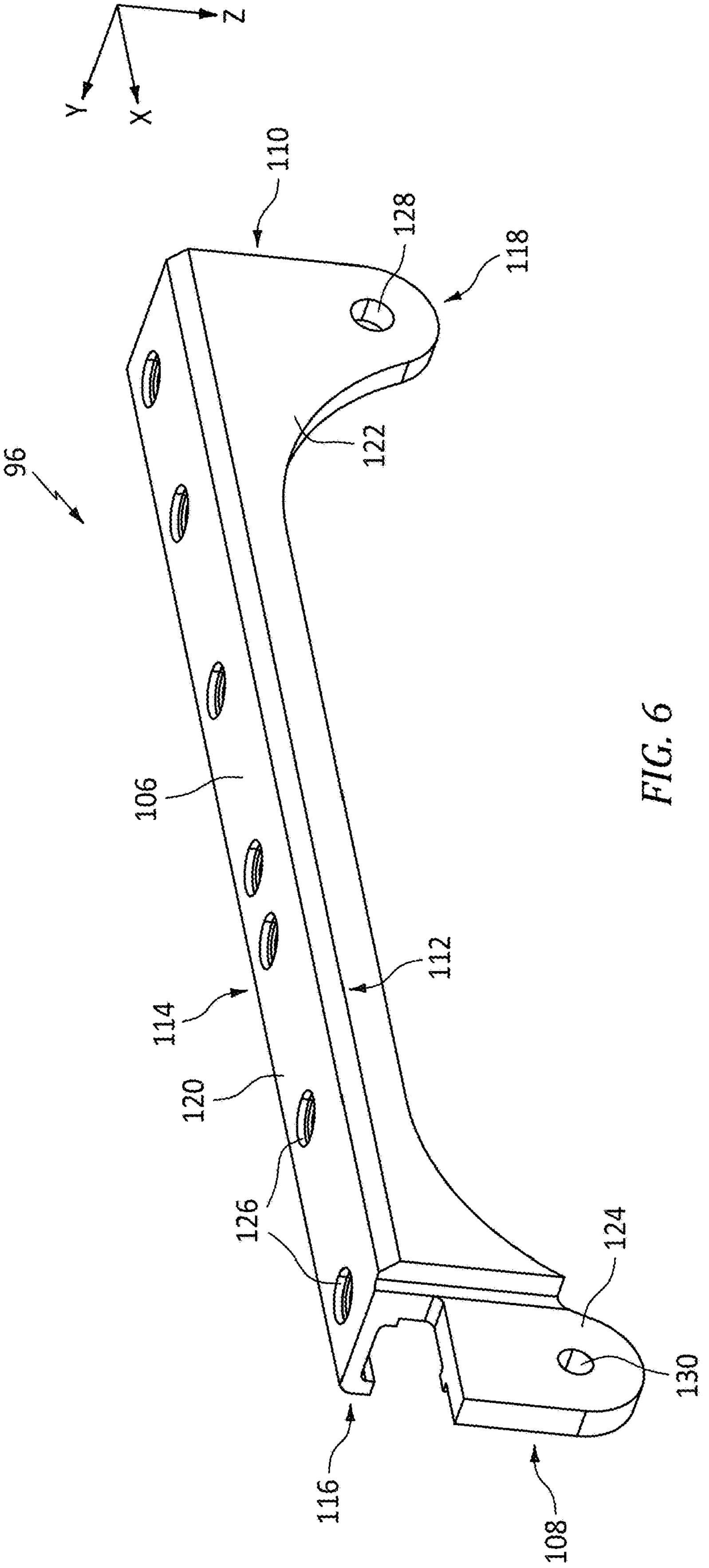
FIG. 6 illustrates a perspective view of a heat exchanger bracket of the mounting assembly, in accordance with one or more embodiments of the present disclosure.
Figure 7:
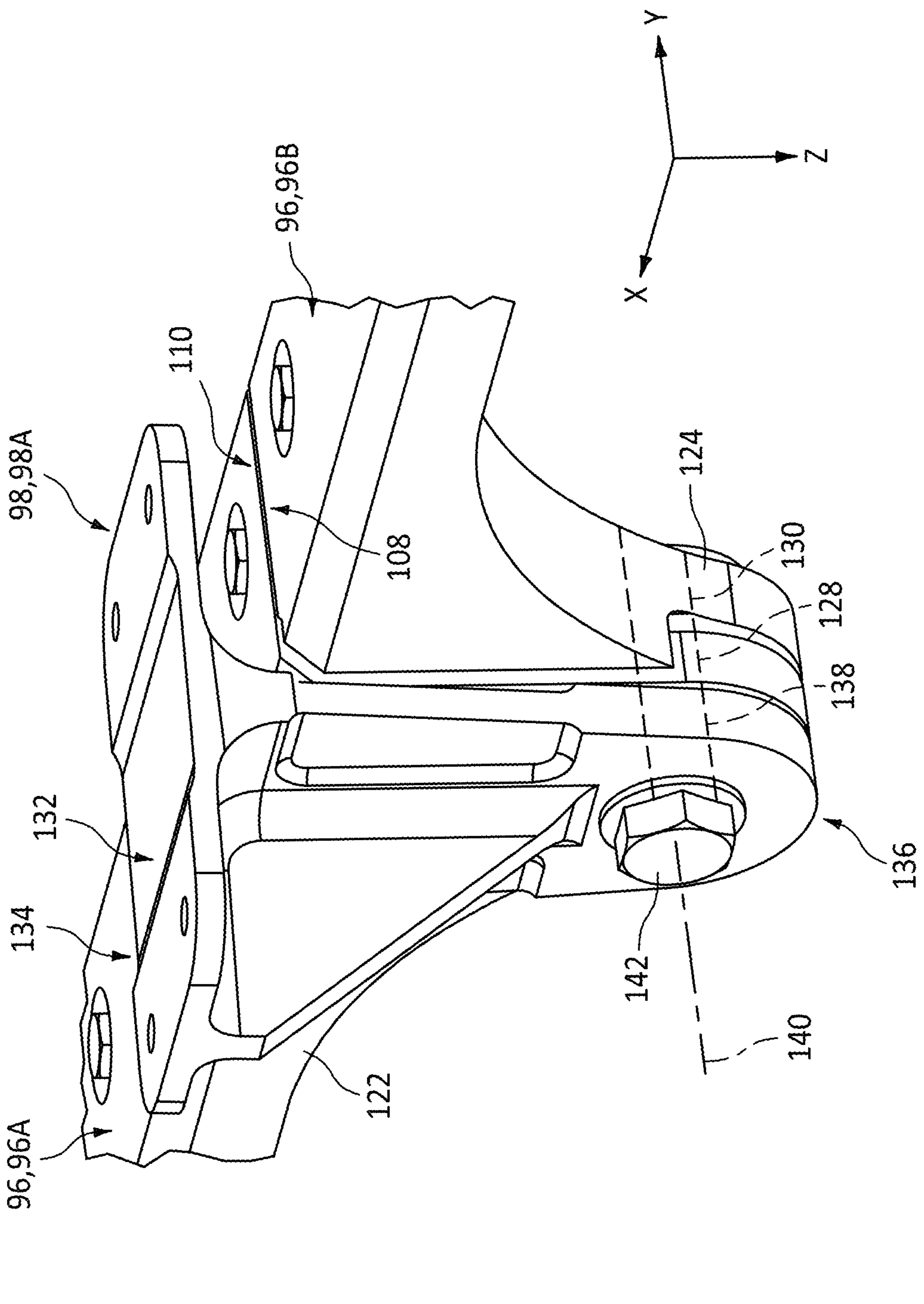
FIG. 7 illustrates a perspective view of heat exchanger brackets and a support bracket of the mounting assembly, in accordance with one or more embodiments of the present disclosure.

FIGS. 6 and 7 illustrate the heat exchanger brackets 96 and the support brackets 98 in greater detail. Each of the heat exchanger brackets 96 includes a bracket body 106. The bracket body 106 extends (e.g., longitudinally extends) between and to a first longitudinal end 108 of the bracket body 106 and a second longitudinal end 110 of the bracket body 106. The bracket body 106 extends (e.g., laterally extends) between and to a first lateral end 112 of the bracket body 106 and a second lateral end 114 of the bracket body 106. The bracket body 106 extends (e.g., vertically extends) between and to a first vertical end 116 (e.g., an upper vertical end) of the bracket body 106 and a second vertical end 118 (e.g., a lower vertical end) of the bracket body 106.

The bracket body 106 includes a first panel body portion 120, a second panel body portion 122, and a lapped body end portion 124. The first panel body portion 120 is disposed at (e.g., on, adjacent, or proximate) the first vertical end 116. The first panel body portion 120 extends along the first vertical end 116 between and to the first lateral end 112 and the second lateral end 114. The first panel body portion 120 extends along the first vertical end 116 from the second longitudinal end 110 toward the first longitudinal end 108. The first panel body portion 120 is longitudinally spaced from the first longitudinal end 108 (e.g., by the lapped body end portion 124). The first panel body portion 120 is configured to be fixedly mounted to a respective one of the underwing heat exchangers 84, as described above. For example, the first panel body portion 120 of FIG. 6 forms a plurality of fastener apertures 126 extending through the first panel body portion 120 (e.g., in the vertical direction). The terms “longitudinal,” “lateral,” and “vertical” are used ease of explanation of the heat exchanger brackets 96 and the support brackets 98 structures (e.g., relative to the wing body 1004 and the underwing heat exchanger assembly 28) and should not be understood as being otherwise limiting on the heat exchanger brackets 96 and the support brackets 98 themselves.

The second panel body portion 122 is disposed at (e.g., on, adjacent, or proximate) the first lateral end 112. The second panel body portion 122 extends along the first lateral end 112 between and to the first vertical end 116 and the second vertical end 118. The second panel body portion 122 extends along the first lateral end 112 from the second longitudinal end 110 toward the first longitudinal end 108. The second panel body portion 122 may be oriented orthogonal or substantially orthogonal relative to the first panel body portion 120. The second panel body portion 122 may form a recess at the second vertical end 118 (e.g., extending toward the first vertical end 116). The second panel body portion 122 is longitudinally spaced from the first longitudinal end 108 (e.g., by the lapped body end portion 124). The second panel body portion 122 forms a first mounting aperture 128 through the second panel body portion 122 (e.g., in the lateral direction). The first mounting aperture 128 may be disposed at (e.g., on, adjacent, or proximate) the second longitudinal end 110 and/or the second vertical end 118 as shown, for example, in FIG. 6.

The lapped body end portion 124 is disposed at (e.g., on, adjacent, or proximate) the first longitudinal end 108. The lapped body end portion 124 is laterally spaced from the first lateral end 112. For example, lapped body end portion 124 may be disposed between the second panel body portion 122 and the second lateral end 114 in the lateral direction. The lapped body end portion 124 extends (e.g., vertically extends) along the first longitudinal end 108 from the second vertical end 118 toward the first vertical end 116. The lapped body end portion 124 is vertically spaced from the first vertical end 116. The lapped body end portion 124 forms a second mounting aperture 130 through the lapped body end portion 124 (e.g., in the lateral direction). The second mounting aperture 130 may be disposed at (e.g., on, adjacent, or proximate) the first longitudinal end 108 and/or the second vertical end 118 as shown, for example, in FIG. 6.

Each of the support brackets 98 includes a bracket body 132. The bracket body 132 extends (e.g., vertically extends) between and to a first vertical end 134 (e.g., an upper vertical end) of the bracket body 132 and a second vertical end 136 (e.g., a lower vertical end) of the bracket body 132. The bracket body 132 is fixedly mounted to the wing body 1004, as discussed above, at (e.g., on, adjacent, or proximate) the first vertical end 134. The bracket body 132 forms a third mounting aperture 138 through the bracket body 132 (e.g., in the lateral direction). The third mounting aperture 138 may be disposed at (e.g., on, adjacent, or proximate) the second vertical end 136 as shown, for example, in FIG. 7.

Each of the heat exchanger brackets 96 is pivotably mounted to two of the support brackets 98 as shown, for example, in FIG. 5. FIG. 7 illustrates an assembly of a first heat exchanger bracket 96A, a second heat exchanger bracket 96B, and a support bracket 98A in greater detail. The first heat exchanger bracket 96A, the second heat exchanger bracket 96B, and the support bracket 98A are pivotably mounted together on a pivot axis 140. The pivot axis 140 may extend in the lateral direction or substantially in the lateral direction (e.g., orthogonal to the longitudinal direction). For example, the first heat exchanger bracket 96A, the second heat exchanger bracket 96B, and the support bracket 98A may be pivotably mounted together on the pivot axis 140 by a mechanical fastener 142 (e.g., a bolt) extending through the first support bracket mounting aperture 128, the second mounting aperture 130, and the third mounting aperture 138 along the pivot axis 140. The first heat exchanger bracket 96A and the second heat exchanger bracket 96B are mounted together on the support bracket 98A with the second longitudinal end 110 of the first heat exchanger bracket 96A abutting or otherwise being disposed at (e.g., on, adjacent, or proximate) the first longitudinal end 108 of the second heat exchanger bracket 96B. The second panel body portion 122 of the first heat exchanger bracket 96A is disposed axially adjacent (relative to the pivot axis 140) the lapped body end portion 124 of the second heat exchanger bracket 96B. In this assembly of the first heat exchanger bracket 96A and the second heat exchanger bracket 96B on the support bracket 98A, the first heat exchanger bracket 96A and the second heat exchanger bracket 96B may each freely pivot about the pivot axis 140 in a first direction but may be restricted from pivoting about the pivot axis 140 in an opposing second direction as the second longitudinal end 110 of the first heat exchanger bracket 96A abuts the first longitudinal end 108 of the second heat exchanger bracket 96B.

As the wing body 1004 generates lift for the aircraft 1000 during flight, the wing body 1004, which is cantilevered relative to other portions of the aircraft 1000 (e.g., the nacelle 24, an aircraft 1000 fuselage, etc.), may bend, particularly along the longitudinal direction. The mounting assembly 86 facilitates accommodation of this bending of the wing body 1004 by the underwing heat exchanger assembly 28. For example, the pivot interface between the heat exchanger brackets 96 and the support brackets 98, as describes above, facilitates a curvature of the underwing heat exchanger assembly 28 (e.g., in a concave direction facing downward) matching a similar bending curvature of the wing body 1004 during flight. Moreover, the configuration of the mounting assembly 86 facilitates improved resilience to a one-bracket-out scenario in which one of the support brackets 98 becomes disconnected from the wing body 1004, for example, as a result of a bird strike, foreign object debris (FOD) strike, or some other physical disruption. In this case, the two heat exchanger brackets 96 pivotably mounted to the disconnected support bracket 98 may abut one other thereby holding the underwing heat exchanger assembly 28 in place on the wing body 1004 supported by other support brackets 98 of the mounting assembly 86.

In some embodiments, the wing assembly 1002 may include the underwing fairing 1006. The underwing fairing 1006 may be mounted to the wing body 1004, for example, by one or more attachment members 1026 (e.g., struts), and disposed vertically beneath the underwing heat exchangers 84. The underwing fairing 1006 may facilitate directing the air flow 1008 through the underwing heat exchangers 84. The underwing fairing 1006 may additionally accommodate fluid conduits interconnecting the underwing heat exchangers 84 with cooling systems (e.g., the thermal management assembly 70) of the aircraft 1000 or its propulsion system 20. The wing body 1004 and the underwing fairing 1006 may form an air passage 1020 through the wing assembly 1002. The air passage 1020 includes an air inlet 1022 and an air outlet 1024. The underwing heat exchangers 84 are disposed within the air passage 1020 between the air inlet 1022 and the air outlet 1024 relative to the air flow 1008.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms “a,” “an,” and “the” refer to one or more than one, unless the context clearly dictates otherwise. For example, the term “comprising a specimen” includes single or plural specimens and is considered equivalent to the phrase “comprising at least one specimen.” The term “or” refers to a single element of stated alternative elements or a combination of two or more elements unless the context clearly indicates otherwise. As used herein, “comprises” means “includes.” Thus, “comprising A or B,” means “including A or B, or A and B,” without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms “substantially,” “about,” “approximately,” and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase “means for.” As used herein, the terms “comprise”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft, the assembly comprising:

a wing assembly including a wing body;

a plurality of underwing heat exchangers arranged along the wing body in a longitudinal direction of the wing assembly, the plurality of underwing heat exchangers includes a first underwing heat exchanger and a second underwing heat exchanger, and the first underwing heat exchanger is longitudinally adjacent the second underwing heat exchanger; and a mounting assembly mounting the plurality of underwing heat exchangers to the wing body, the mounting assembly includes a plurality of heat exchanger brackets and a plurality of support brackets, the plurality of heat exchanger brackets includes a first heat exchanger bracket and a second heat exchanger bracket, the plurality of support brackets includes a first support bracket, the first heat exchanger bracket is fixedly mounted to the first underwing heat exchanger, the second heat exchanger bracket is fixedly mounted to the second underwing heat exchanger, the first heat exchanger bracket and the second heat exchanger bracket are pivotably mounted to the first support bracket on a pivot axis, and the first support bracket is fixedly mounted to the wing body.

2. The assembly of claim 1, wherein the wing body includes an upper skin and a lower skin, and the mounting assembly mounts the plurality of underwing heat exchangers on the lower skin.

3. The assembly of claim 1, wherein the wing assembly further includes an underwing fairing mounted to the wing body, the wing body and the underwing fairing form an air passage through the wing assembly, and the plurality of underwing heat exchangers are disposed within the air passage.

4. The assembly of claim 1, wherein the pivot axis extends in a lateral direction orthogonal to the longitudinal direction.

5. The assembly of claim 1, wherein the first heat exchanger bracket and the second heat exchanger bracket are axially coincident relative to the pivot axis.

6. The assembly of claim 1, wherein each of the heat exchanger brackets includes a bracket body, the bracket body extends between and to a first longitudinal end and a second longitudinal end, the bracket body extends between and to a first lateral end and a second lateral end, the bracket body includes a panel body portion and a lapped body end portion, the panel body portion extends along the first lateral end from the second longitudinal end to the lapped body end portion, the lapped body end portion is disposed at the first longitudinal end, and the lapped body end portion is laterally spaced from the first lateral end.

7. The assembly of claim 6, wherein the panel body portion of the first heat exchanger bracket is pivotably mounted to the first support bracket on the pivot axis and the lapped body end portion of the second heat exchanger bracket is pivotably mounted to the first support bracket on the pivot axis.

8. The assembly of claim 1, further comprising an aircraft propulsion system, the aircraft propulsion system includes a coolant load and a thermal management assembly connected in fluid communication with the coolant load, and the thermal management assembly includes at least one of the plurality of underwing heat exchangers.

9. An assembly for an aircraft, the assembly comprising:

a wing assembly including a wing body;

a plurality of underwing heat exchangers arranged along the wing body in a longitudinal direction of the wing assembly; and a mounting assembly mounting the plurality of underwing heat exchangers to the wing body, the mounting assembly includes a plurality of heat exchanger brackets and a plurality of support brackets, each of the heat exchanger brackets is fixedly mounted to a respective one of the plurality of underwing heat exchangers, each of the heat exchanger brackets includes a bracket body extending between and to a first longitudinal end and a second longitudinal end, the bracket body is pivotably mounted to a first support bracket of the plurality of support brackets at the first longitudinal end, the bracket body is pivotably mounted to a second support bracket of the plurality of support brackets at the second longitudinal end, and each of the plurality of support brackets is fixedly mounted to the wing body.

10. The assembly of claim 9, wherein the wing body includes an upper skin and a lower skin, and the mounting assembly mounts the plurality of underwing heat exchangers on the lower skin.

11. The assembly of claim 9, wherein the wing assembly further includes an underwing fairing mounting to the wing body, the wing body and the underwing fairing form an air passage through the wing assembly, and the plurality of underwing heat exchangers are disposed within the air passage.

12. The assembly of claim 9, wherein the bracket body is pivotably mounted to the first support bracket on a first pivot axis, the bracket body is pivotably mounted to the second support bracket on a second pivot axis, and the first pivot axis and the second pivot axis extend in a lateral direction orthogonal to the longitudinal direction.

13. The assembly of claim 9, wherein the plurality of underwing heat exchangers includes a first underwing heat exchanger and a second underwing heat exchanger, the plurality of heat exchanger brackets includes a first heat exchanger bracket and a second heat exchanger bracket, the first heat exchanger bracket is fixedly mounted to the first underwing heat exchanger, the second heat exchanger bracket is fixedly mounted to the second underwing heat exchanger, and the first heat exchanger bracket and the second heat exchanger bracket are pivotably mounted to a same support bracket of the plurality of support brackets.

14. The assembly of claim 9, wherein the bracket body extends between and to a first lateral end and a second lateral end, the bracket body includes a panel body portion and a lapped body end portion, the panel body portion extends along the first lateral end from the second longitudinal end to the lapped body end portion, the lapped body end portion is disposed at the first longitudinal end, and the lapped body end portion is laterally spaced from the first lateral end.

15. The assembly of claim 14, wherein the panel body portion is pivotably mounted to the first support bracket and the lapped body end portion is pivotably mounted to the second support bracket.

16. An assembly for an aircraft, the assembly comprising:

a wing assembly including a wing body, the wing body includes an upper skin and a lower skin, and the lower skin forms a lower aerodynamic surface of the wing body;

a plurality of underwing heat exchangers arranged along the lower aerodynamic surface in a longitudinal direction of the wing assembly, the plurality of underwing heat exchangers includes a first underwing heat exchanger and a second underwing heat exchanger, and the first underwing heat exchanger is longitudinally adjacent the second underwing heat exchanger; and a mounting assembly including a first heat exchanger bracket, a second heat exchanger bracket, and a first support bracket, the first heat exchanger bracket is fixedly mounted to the first underwing heat exchanger, the second heat exchanger bracket is fixedly mounted to the second underwing heat exchanger, the first heat exchanger bracket and the second heat exchanger bracket are pivotably mounted to the first support bracket on a pivot axis, and the first support bracket is fixedly mounted on the wing body at the lower aerodynamic surface.

17. The assembly of claim 16, wherein the wing assembly further includes an underwing fairing, the wing body and the underwing fairing form an air passage between the lower aerodynamic surface and the underwing fairing, and the plurality of underwing heat exchangers are disposed within the air passage.

18. The assembly of claim 16, wherein the pivot axis extends in a lateral direction orthogonal to the longitudinal direction.

19. The assembly of claim 16, wherein the first heat exchanger bracket and the second heat exchanger bracket are axially coincident relative to the pivot axis.

20. The assembly of claim 1, wherein the first heat exchanger bracket and the second heat exchanger bracket each include a bracket body, the bracket body extends between and to a first longitudinal end and a second longitudinal end, the bracket body extends between and to a first lateral end and a second lateral end, the bracket body includes a panel body portion and a lapped body end portion, the panel body portion extends along the first lateral end from the second longitudinal end to the lapped body end portion, the lapped body end portion is disposed at the first longitudinal end, and the lapped body end portion is laterally spaced from the first lateral end.

* * * * *